UNITED STATES PATENT OFFICE.

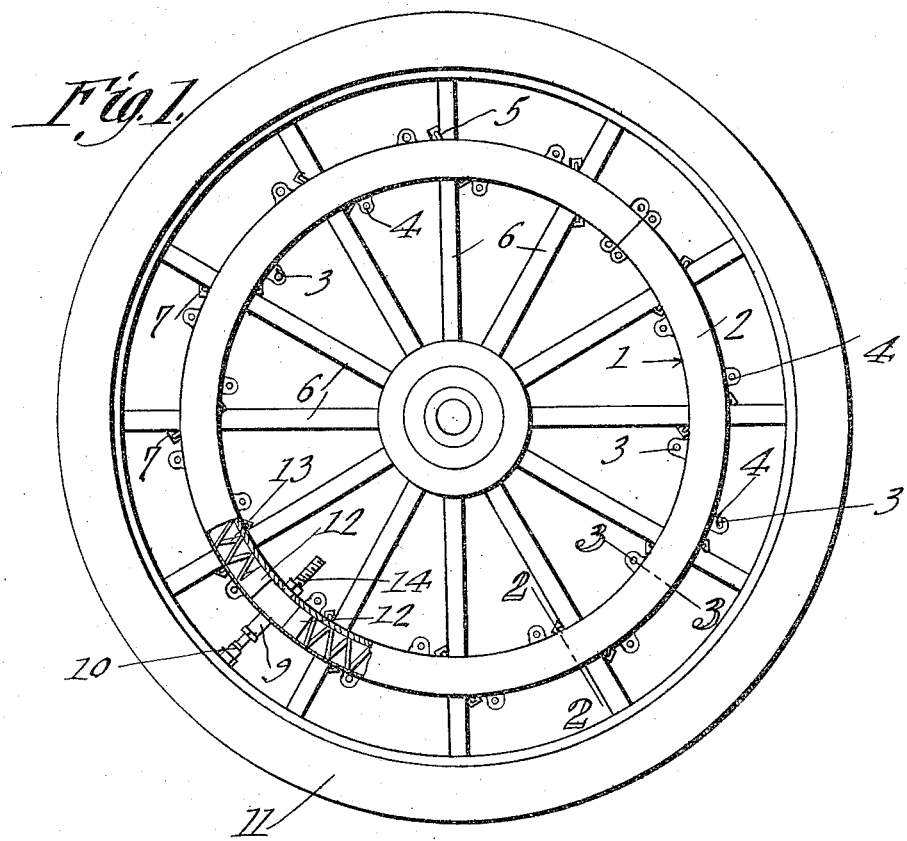
G. D. LEWIS.
PRESSURE REGULATOR FOR PNEUMATIC TIRES.
APPLICATION FILED MAR. 5, 1915.
1,173,008.  Patented Feb. 22, 1916.

GEORGE D. LEWIS, OF GENESEE, PENNSYLVANIA.

PRESSURE-REGULATOR FOR PNEUMATIC TIRES.

1,173,008.  Specification of Letters Patent.  Patented Feb. 22, 1916.

Application filed March 5, 1915. Serial No. 12,435.

*To all whom it may concern:*

Be it known that I, GEORGE D. LEWIS, a citizen of the United States, residing at Genesee, in the county of Potter and State of Pennsylvania, have invented a new and useful Pressure-Regulator for Pneumatic Tires, of which the following is a specification.

The present invention appertains to a pressure regulating device for the pneumatic tires of automobiles or motor vehicles, and aims to provide a novel and improved device whereby the pressure of the air within the tire may be maintained at a normal or predetermined pressure.

It is also the object of the invention to provide a unique attachment for a wheel having a pneumatic tire and which is attachable to the valve stem in order to carry out the intended object.

It is also within the scope of the invention to provide a pressure regulator for pneumatic tires which is comparatively simple in construction, cheap to manufacture, and practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a side elevation of a vehicle wheel having the present attachment applied thereto, portions being broken away. Figs. 2 and 3 are enlarged cross sectional views taken on the lines 2—2 and 3—3, respectively, of Fig. 1.

In carrying out the invention, there is provided an annular tubular casing 1, which is preferably composed of two annular coöperating or mating sections 2. These sections 2 are provided along their edges with coöperating ears 3 through which bolts or other securing elements 4 are engaged, to clamp the sections 2 tightly together. The sections 2 preferably have a ground joint therebetween, whereby the casing 1 will be air tight. The casing 1 is attached to one side of the vehicle wheel concentric with and between the tire and hub, and to this end, U-shaped bolts or clips 5 have their bends attached to the inner section of the casing and the said bolts or clips straddle the spokes 6, and clamping bars 7 are engaged to the end portions of the bolts 5 and bear against the spokes 6. Nuts 8 are threaded upon the ends of the bolts 5 for clamping the bolts 5 to the spokes in a rigid and simple manner. The casing 1 is provided with an outwardly projecting nipple 9 which is engaged to the inwardly projecting valve stem 10 of the pneumatic tire 11, the valve having been removed from the stem 10, whereby the air is free to flow inwardly and outwardly through the stem 10 and nipple 9 and between the tire and casing 1. A pair of pistons 12 are disposed for longitudinal movement within the casing 1 at the opposite sides of the nipple 9, and a coiled wire expansion spring 13 composed of one or more sections is disposed within the casing 1 and extends almost completely therearound. The pistons 12 bear against the terminal convolutions of the spring 13, and the spring normally forces the pistons 12 to a point adjacent the nipple 9 when the air within the casing 1 between the pistons 12 is almost completely forced out of the casing 1. The casing 1 is also provided with a valve stem 14 projecting inwardly therefrom adjacent the nipple 9, and between the pistons 12, and the valve stem 14 is similar to the ordinary valve stem of a pneumatic tire, whereby air may be pumped into the casing 1 between the pistons 12.

In pumping up the tire 11, the pump is connected to the valve stem 14 of the casing 1, and air is injected into the casing 1, and will flow through the nipple 9 and stem 10 into the tire 11 to inflate the same. When the desired amount of air is forced into the tire, the valve (not shown) within the stem 14 will prevent the escape of air. The spring 13 is of sufficient tension to overcome the normal or desired pressure of air within the tire, whereby the pistons 12 will be prevented from being separated by the air pressure. However, should the pressure of the air within the tire rise to an excessive or abnormal degree, such as is caused by the heating of the tire and air therein, the air may flow back into the casing 1 and the pistons 12 will be separated against the tension of the spring 13. Thus, the excessive or abnormal pressure will overcome the tension of the spring 13, and the pistons 12 being separated allow the superfluous air to enter the casing 1 and to therefore relieve the tire 11 of excessive pressure. When the pressure of air within the tire decreases, due to the cooling of tire and air therein, the springs 13 will force the pistons 12 backward toward the nipple 9, and the air will again be forced into the tire 11 to bring the air pressure therein to normal condition.

The present device acts as a regulator and serves its office in a desirable manner. The present attachment may be readily applied to the wheel and the pistons 12 being movable within the circular or annular casing 1 gives the present device a suitable capacity. The pistons 12 are opposed to one another and are detached from one another, and even though one piston 12 should stick or bind within the casing 1, the other is free to yield under the air pressure.

Having thus described the invention, what is claimed as new is:—

A pressure regulator for pneumatic tires embodying an annular casing, means for attaching the casing to the spokes of a wheel, a coiled wire expansion spring disposed within the casing, a pair of pistons working circumferentially within the casing and co-operating with the ends of the spring, the casing having a nipple between the pistons for attachment to the valve stem of a pneumatic tire, and the casing having a valve stem between the pistons for injecting air through the casing and into the tire.

In testimony that I claim the foregoing as my own, I have hereto affixed my signature in the presence of two witnesses.

GEORGE D. LEWIS.

Witnesses:
E. H. CHAMPLIN,
B. E. NELSON.

Copies of this patent may be obtained for five cents each, by addressing the "Commissioner of Patents, Washington, D. C."